Patented July 26, 1949

2,476,988

UNITED STATES PATENT OFFICE 2,476,988

5-ACYLOXYPYRAZOLE AMIDOACETALS

Elmore Louis Martin, Wilmington, Del., assignor to E. I. du Pont de Nemours & Company, Wilmington, Del., a corporation of Delaware No Drawing. Application July 8, 1946, Serial No. 682,137

7 Claims. (Cl. 260—310)

This invention relates to color-forming amido-aldehyde acetals of vinyl alcohol polymers and, more particularly, to 5-acyloxypyrazole amidoaldehyde acetals of vinyl alcohol polymers.

Pyrazolone and various low and high molecular weight derivatives thereof have been proposed as color formers in the color-coupling development of exposed silver halide images. Among the proposed high molecular weight derivatives are the amides formed from phenylmethyl-pyrazolone carboxylic acid, phenyl-pyrazolone carboxylic acid, and methyl naphthyl pyrazolone carboxylic acids with m-aminobenzaldehyde polyvinyl acetal and ethyl aminobenzaldehyde polyvinyl acetal. It has been found that the amidation reactions just described are accompanied by undesirable side reactions which deleteriously affect the nature of the polyvinyl acetal color formers. Among such side reactions are the esterification of hydroxyl groups of the polyvinyl alcohol and cross-linking of the polymer chains leading to products of poor solubility. When pyrazolone aldehydes, which have a reactive methylene group in the 4-position, are used to form polyvinyl acetals, side reactions also occur, namely one aldehyde group will combine with two molecular equivalents of a pyrazolone aldehyde through the reactive methylene groups.

An object of this invention is to provide a method of preparing relatively pure polyvinyl acetal color formers containing a pyrazole nucleus. Another object is to provide such a method which is free from undesirable side reactions. A further object is to provide a new class of soluble, color-forming acetals of vinyl alcohol polymers which contain 5-acyloxypyrazole nuclei. A still further object is to provide new polymeric color formers for chromogenic development of photographic elements. Still other objects will be apparent from the following description of the invention.

It has been found that a novel class of 5-acyloxypyrazole amidoacetals of vinyl alcohol polymers can be made by condensing (1) a 5-acyloxypyrazole containing an amidoaldehyde group in the 1- or 3-position, which compounds are free from ketaldone reactive groups, e. g., amino, reactive methylene, and thiol groups, or the lower acetals of such aldehydes, for example, with alkanols of 1 to 4 carbon atoms or 1,2- or 1,3-alkanediols of 2 to 4 carbon atoms with (2) a vinyl alcohol polymer under acetal-forming conditions, e. g., in solution or in suspension, in the presence of a condensation catalyst of acid reaction, for instance, a mineral acid, an organic acid, or an acid-reacting salt.

The 5-acyloxypyrazole amidoaldehydes and their lower acetals referred to above can be made from the 5-acyloxypyrazoles which contain an acid halide group in at least one of the positions 1 and 3 of the pyrazole ring. Such compounds may be represented by the general formula

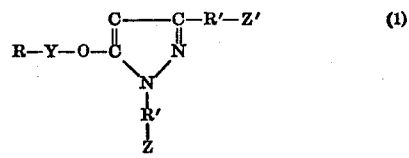

wherein Y is a member taken from the group consisting of carbonyl (—CO—) and sulfonyl (—SO₂—) radicals; R—Y— is an acyl radical; R' is a divalent organic radical linked by "hydrocarbon" carbon atoms (viz., having hydrogen or hydrocarbon groups attached thereto) to the cyclic carbon or cyclic nitrogen atom and to Z and Z' as shown; and Z and Z' are members taken from the group consisting of hydrogen, amidoaldehyde and amidoacetal groups. However, one of the groups Z and Z' must contain an amidoaldehyde or amidoacetal group. R' in Formula 1 is a divalent aliphatic, aromatic, or heterocyclic nucleus but may consist of two such nuclei joined by a bivalent bridging radical, e. g., —O—, —S—, —CO—, —SO₂—, —SO₂NH—, and —CONH—. Useful compounds of this type and their preparation are described in application Serial Number 667,125, filed May 3, 1946.

The compounds just described fall within two general classes of amidoaldehydes and their acetals with monohydric alcohols of 1 to 4 carbon atoms and 1,2- and 1,3-dihydric alcohols of 2 to 4 carbon atoms. In one case the amido acetal or aldehyde group is in the 1-position in the pyrazole nucleus and in the other it is in the 3-position. The amidoaldehydes are represented by the following two formulae:

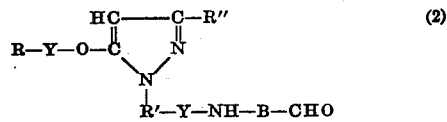

and

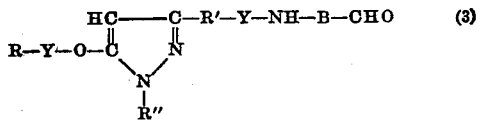

wherein Y, R, and R' have the same significance as in Formula 1, R'' is a monovalent hydrocarbon nucleus, and B has the same significance as R' but need not be identical.

The preferred compounds may be represented by the formula:

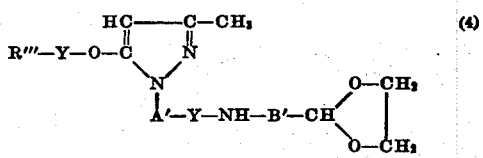

wherein Y is a carbonyl or sulfonyl radical; A' is a divalent hydrocarbon nucleus which is attached to the 1-nitrogen atom through an aromatic hydrocarbon radical; B' is a phenylene radical; and R''' is a member of the group consisting of alkyl of 1 to 3 carbon atoms, alkoxy radicals of 1 to 2 carbon atoms, phenyl, methylphenyl, and ethylphenyl. These compounds are preferred because the reactant materials are commercially available and, what is more important, the resulting azomethine dyes have superior color characteristics for color photography. The compounds where R''' is alkoxy are preferred because of their resistance to hydrolysis and ease of obtaining the compounds in crystalline form.

The hydrocarbon nuclei in Formulae 1, 2, and 3 may be unsubstituted or contain various substituents which are common in color formers and do not enter into dye coupling reactions, e. g., methoxy, alkyl, aryl, halogen, and nitro groups but should be free from aldehyde reactive groups as above described.

When compounds of Formulae 1, 2, 3, and 4 are reacted with a vinyl alcohol polymer, the aldehyde group forms an acetal linkage by interaction with hydroxyl groups of the polymer so that the final compounds contain nuclei similar to the nucleus of said formula except that in place of the

or aldehyde radical or lower acetal radical, an acetal linkage

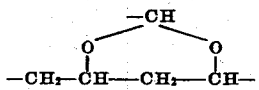

occurs. A plurality of recurring linkages of this type are present in the final polymer. When the lower acetals corresponding to the compounds of Formulae 1, 2, 3, and 4 are used, they form similar polymeric compounds by acetal interchange.

Two important classes of novel polymeric vinyl alcohol color formers contain nuclei similar to those of Formulae 2 and 3 and may be represented by the following unit formulae:

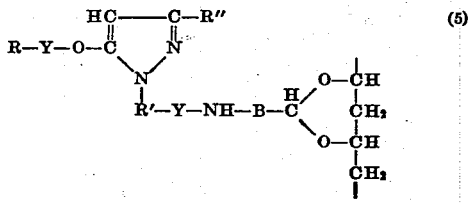

and

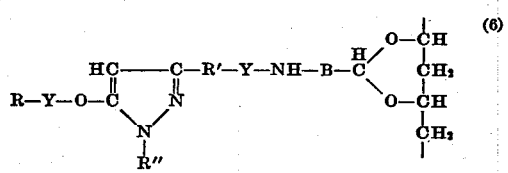

wherein the various substituents have the same significance as in Formulae 2, 3, and 4 above.

A preferred class of compounds are made from the ethylene glycol acetals of Formula 4 and contain similar nuclei except that the ethylene glycol radical is replaced by acetal interchange and the final compounds contain nuclei represented by the following formula:

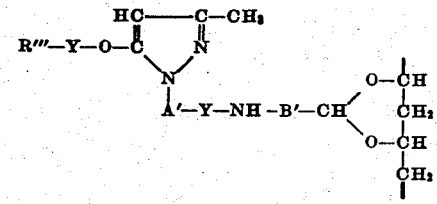

wherein Y is a carbonyl or sulfonyl radical; A' is a divalent hydrocarbon nucleus which is attached to the 1-nitrogen atom through an aromatic hydrocarbon radical; B' is a phenylene radical; and R''' is a member of the group consisting of alkyl of 1 to 3 carbon atoms, alkoxy radicals of 1 to 2 carbon atoms, phenyl, methylphenyl, and ethylphenyl. These compounds are preferred because the reactant materials are commercially available and, what is more important, the resulting azomethine dyes have superior color characteristics for color photography. The compounds where R''' is alkoxy are preferred because of their resistance to hydrolysis.

The invention will be further illustrated by the following examples. The parts are by weight.

EXAMPLE I

To a suspension of ten parts of polyvinyl alcohol in 70 parts of anhydrous dioxane and 0.5 part of 85% phosphoric acid is added three parts of m-[p-(5 - ethylcarbonato - 3 - methyl - 1 - pyrazolyl)benzamido]benzaldehyde dimethyl acetal prepared after the manner described in Procedure A below, and the mixture is stirred at 65–70° C. for four hours. The mixture is filtered and the filter cake is stirred with several changes of methanol during a period of two hours. Methanol splits off and a polyvinyl alcohol acetal is formed by acetal interchange. A 2% solution of the acetal in 30% aqueous ethanol is prepared by heating at 70–75° C. and to about five parts of the polyvinyl acetal solution is added two parts of a 1% sodium carbonate solution, two parts of a 0.04% solution of para-aminodiethylaniline, and after mixing thoroughly two parts of a 2.6% potassium ferricyanide is added. A strong magenta azomethine dye is produced. This is a convenient test for ability to couple with p-aminodiethylaniline and color developers of this type.

EXAMPLE II

To a suspension of 15 parts of polyvinyl alcohol in 60 parts of anhydrous dioxane containing 0.5 part of 85% phosphoric acid is added 4.8 parts of m[p-(5-ethylcarbonato - 3 - methyl-1-pyrazolyl)benzamido] benzaldehyde (prepared after the manner described in Example I of application Serial Number 667,125 filed May 3, 1946) and the mixture is stirred at 80° C. for seven hours. The mixture is filtered, washed on the funnel first with a small volume of dioxane, and then with acetone. The filter cake is stirred with four changes of acetone during a period of about 20 hours. To ten parts of the polyvinyl acetal containing the same 5-acyloxypyrazole nuclei as in the aldehyde reactant, there is added 80 parts of ethanol, 110 parts of water, and a sufficient volume (about one part) of 10% sodium hydroxide solution to adjust the pH of the suspension to a value of 7.0–7.5. After heating with stirring at 75–80° C. for one-half hour, a homogeneous solution is obtained, which is cooled to 40° C. and used to prepare a silver halide emulsion under conditions which will not expose or cause fogging of the sensitive silver salts as follows.

To 90 parts of the above solution is added 31 parts of 3 N ammonium bromide solution and two parts of an 0.5 N potassium iodide solution. This solution is stirred at 40° C., while adding a solution of 29 parts of 3 N silver nitrate, 50 parts of water, and 15.3 parts of 28% ammonium hydroxide during one minute. After stirring for a total of one-half hour, 150–200 parts of a 15% sodium sulfate solution is added. The precipitated silver halide-color-former emulsion is washed for one hour in running water, after which the excess water is drained off. The remainder of the original polyvinyl acetal solution, together with 30 parts of ethanol and 15 parts of water, is added and the mixture is stirred at 65° C. for 0.5 hour. After cooling to 25° C. the emulsion is coated on baryta-sized white paper. The resulting paper is exposed to form latent images, then developed in a solution made by admixing the following components:

| | Parts |
|---|---|
| p-Aminodiethylaniline hydrochloride | 2 |
| Sodium sulfite (anhydrous) | 10 |
| Sodium carbonate (monohydrate) | 20 |
| Potassium bromide | 2 |
| Water to make | 1000 |

The paper is then fixed in 25% sodium thiosulfate, washed, bleached in 4 potassium ferricyanide, washed, fixed in 25% sodium thiosulfate, and washed. The resulting paper contains a bright, strong, magenta negative dye image.

Thirty parts of the above polymer is dissolved in a mixture of 40 parts ethanol and 130 parts of water. This solution is divided in two equal parts. One portion is added to 500 parts of a melted gelatin-silver bromide emulsion and the resulting dispersion coated on subbed cellulose nitrate. The dried film is then exposed to light and treated with a p-aminodiethylaniline developer of the composition given above. A strong magenta dye was formed in the exposed areas. Prolonged washing of the film and leaching with 2% sodium carbonate solution prior to color development led to no removal of color former. The other portion of the polymeric color former solution is added to 500 parts of a silver bromide emulsion in a hydrolyzed ethylene/vinyl acetate interpolymer of low ethylene content, prepared as described in Example XI of United States Patent 2,386,347. Color development of an exposed, coated film gives a strong, brilliant magenta dye as with the gelatin emulsion and the polymeric color-former is completely non-migratory.

Example III

To a suspension of 2300 parts of polyvinyl alcohol in 6100 parts of anhydrous dioxane, 61 parts of water and 120 parts of about 95% phosphoric acid is added to 765 parts of m-[p-(5-ethylcarbonato-3-methyl-1 - pyrazolyl)benzamino]benzaldehyde and the mixture is stirred at 79° C. for a period of 78 hours. The mixture is filtered, the filter cake is washed with a small volume of dioxane, then with about 2400 parts of acetone. The filter cake is transferred to a suitable container and is stirred for 0.5 hour with 4800 parts of acetone. The mixture is filtered, the filter cake is stirred for 15 minutes with 4000 parts of methanol and filtered. The filter cake is stirred with 4800 parts of acetone for 14 hours, filtered, and stirred an additional period of six hours with 4800 parts of acetone. On drying, there is obtained 2550 parts of polyvinyl acetal containing the same 5-acyloxypyrazole nuclei present in the aldehyde reactant. This increase in weight corresponds to a color former content of approximately 12% on a weight basis. Processing a piece of paper coated with a silver halide emulsion prepared in this polyvinyl acetal as described in Example II gives strong, magenta, negative images.

Example IV

To a suspension of 500 parts of polyvinyl alcohol in 1050 parts of acetone containing 23 parts of 85% phosphoric acid is added 167 parts of m-[p-(5-ethylcarbonato - 3 - methyl - 1 - pyrazolyl) benzamido]benzaldehyde and the mixture is stirred at the reflux temperature (57° C.) of the mixture for 23 hours. The mixture is filtered, the filter cake is transferred to a suitable container and washed with four changes of about 1100 parts each of acetone during a period of five hours. The color former content of this polyvinyl acetal recovered is approximately 17% on a weight basis, and an emulsion prepared as described in Example II gives smooth coatings on paper which, on processing as described in Example II, give strong, magenta, negative azomethine dye images.

Example V

To a suspension of 12 parts of polyvinyl alcohol in 40 parts of dioxane and one part of 85% phosphoric acid is added four parts of m-[p-(5-benzoxy - 3 - methyl - 1 - pyrazolyl)benzamido] benzaldehyde, prepared after the manner disclosed in Example V of application Serial No. 667,125, filed May 3, 1946 and the mixture is stirred at 70–72° C. for eight hours. The polyvinyl acetal mixture is treated as described in Example III to remove unreacted aldehyde. Paper coated from an emulsion prepared from this polyvinyl acetal as described in Example II gives a strong, magenta dye image on photographic processing.

Example VI

To a mixture of 45 parts of polyvinyl alcohol and eight parts of m-[p-(5-ethylcarbonato-3-methyl-1 - pyrazolyl)benzamido]benzaldehyde is added a solution of 5.4 parts of approximately 95% phosphoric acid in 330 parts of ethylene glycol, and the resulting suspension is stirred at 65°–66° C. for one hour. The mixture is cooled to about 55° C. and 120 parts of acetone are added slowly. The mixture is filtered, washed on the funnel with acetone, and transferred to a suitable vessel and washed for 30 minutes with 150 parts of acetone. The washing process is continued for a total of 22 hours, the acetone being changed at the end of 2, 6, and 10 hours. The yield of magenta color-forming polyvinyl acetal is 52 parts. The color-former content, based on the weight gained, amounts to 15% by weight, which is in agreement with the actual analysis of the polyvinyl acetal for color-former content.

Example VII

A mixture of 15 parts of m-[p-(5-ethylcarbonato-3-methyl-1 - pyrazolyl)benzamido]benzaldehyde ethylene glycol acetal, prepared after the manner described in Example I of application Serial No. 667,125, filed May 3, 1946, and 450 parts of ethylene glycol is heated to 90° C. to effect solution of the acetal, the solution is cooled to 70° C. and a mixture of 50 parts of ethylene glycol and 8.5 parts of about 95% phosphoric acid is added, followed by the addition of 75 parts of polyvinyl alcohol. The resulting suspension is stirred at 66°–67° C. for 45 minutes, is cooled to 60° C. and 300 parts of methanol are added. The resulting polyvinyl acetal is collected and washed with 500 parts of methanol. The filter cake is transferred to a suitable container, suspended in 300 parts of methanol and a solution of 2.5 parts of triethylamine in 50 parts of methanol is added. After stirring for 15 minutes, the polyvinyl acetal is collected, washed with methanol and stirred with 300 parts of methanol for one-half hour. After filtering, the polyvinyl is stirred for one hour with 300 parts of acetone. After drying, there is obtained 86 parts of color-forming polyvinyl acetal.

EXAMPLE VIII

A mixture of 200 parts of polyvinyl alcohol, 26 parts of 85% phosphoric acid, 600 parts of anhydrous dioxane, and 93 parts of m-[p-(5-benzoxy - 3 - methyl-1-pyrazolyl) benzenesulfonamido]benzaldehyde, prepared after the manner described in Example II of application Serial No. 667,125, filed May 3, 1946, is stirred at 77–79° C. for nine hours. The mixture is filtered and is washed with 400 parts of acetone on the funnel. The product is transferred to a suitable container, slurried with 400 parts of acetone, and filtered. The polymer is washed in a similar manner with methanol to remove the phosphoric acid. The washing with acetone is repeated five times and the polyvinyl acetal is collected and dried. The yield of polymer is 215 parts and it contains 7% by weight of color-former groups.

EXAMPLE IX

To a solution of two parts of m-[p-(5-ethylcarbonato - 1 - methyl - 3-pyrazolyl) benzamido] benzaldehyde of the formula

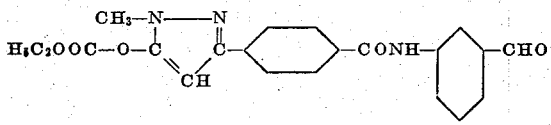

prepared after the manner described in Procedure B below in 88 parts of ethylene glycol, prepared by heating to 120° C. and cooling rapidly to 80° C., is added one part of 95% phosphoric acid. After cooling to 60° C., there is added a mixture of ten parts of polyvinyl alcohol and one part of ortho-sulfobenzaldehyde sodium salt. The resulting suspension is stirred at 65° C. for 50 minutes, is cooled to 40° C., and 100 parts of methanol is added. The polyvinyl acetal obtained is filtered and the residual acid catalyst and unreacted color-former are removed as described in Example VII.

A piece of paper coated with this polyvinyl acetal as the binder for the silver halide, after the manner described in Example II, gives bluish-magenta dye images after development of the latent images and processing as described in detail in Example II.

EXAMPLE X

A mixture of five parts of m-[p-(5-ethylcarbonato - 3 - phenyl - 1 - pyrazolyl) benzamido]benzaldehyde of the formula

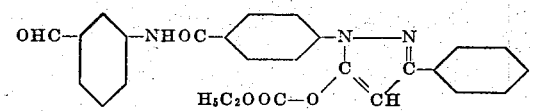

prepared after the manner described in Procedure C below, and 1.7 parts of ortho-sulfobenzaldehyde sodium salt, two parts of 95% phosphoric acid, 25 parts of polyvinyl alcohol and 785 parts of ethylene glycol is stirred at 64–65° C. for 50 minutes, cooled to 60° C. and 200 parts of methanol is added. The polyvinyl acetal obtained is collected on a filter freed of residual acid catalyst and traces of unreacted color-former as described in Example VII.

Development of piece of coated paper, prepared after the manner described in Example II, gave a purplish magenta dye.

EXAMPLE XI

A mixture of five parts of m-[p-(5-ethylcarbonato - 1 - phenyl - 3-pyrazolyl) benzamido]benzaldehyde of the formula

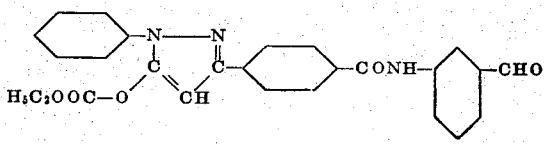

prepared after the manner described in Example VI in application Serial No. 667,125 filed May 3, 1946, 2.5 parts of ortho-sulfobenzaldehyde sodium salt, 1.8 parts of 95% phosphoric acid and 20 parts of polyvinyl alcohol is stirred in 150 parts of ethylene glycol at 64–65° C. for 50 minutes. After cooling to 30° C., 200 parts of methanol is added and the polyvinyl acetal freed of residual acid catalyst and unreacted color-former essentially as described in Example VII. An emulsion prepared and coated on paper after the manner described in Example II gave strong, purplish magenta images after development of the latent images.

The polymers of Examples VI, VII, VIII, IX, X, and XI can be used to prepare photographic emulsions suitable for color photography either as the sole binding agent or by addition to emulsions prepared in other binding agents in the manner illustrated in Example II.

PROCEDURE A m-[p -(5-ethylcarbonato-3-methyl-1-pyrazolyl) - benzamido]benzaldehyde dimethyl acetal

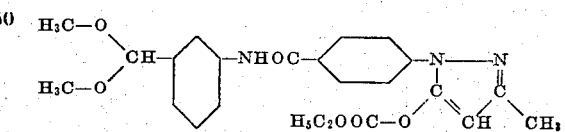

A solution of nine parts of 1-(4'-chloroformyl-phenyl-3-methyl-5-pyrazolyl) ethyl carbonate prepared as described in Example I of copending application Serial No. 657,629 in 25 parts of anhydrous dioxane is added dropwise to a mechanically stirred suspension of five parts of anhydrous potassium carbonate, 50 parts of water and seven parts of m-aminobenzaldehyde dimethyl acetal maintained at 0°–5° C. by means of external cooling. Stirring at 2°–3° C. is continued for two hours and the resulting oil is separated, dissolved in ether, and the ethereal solution is washed first with dilute acetic acid and then with dilute sodium bicarbonate solution. After removal of the ether, a light-yellow oil remains which does not crystallize. Hydrolysis of a small portion as described in Example I of copending application Serial No. 667,125, filed May 3, 1946 gives the free aldehyde melting at 135°–136° C.

Procedure B

1-methyl-3-(p-carboxyphenyl)-5-pyrazolone

A solution of 14.4 parts of methylhydrazine sulfate, 26.4 parts of ethyl p-carbethoxybenzoylacetate, 27.2 parts of sodium acetate trihydrate, 25 parts of glacial acetic acid, 40 parts of ethanol and 100 parts of water is boiled gently for one hour and then acidified by the addition of 6 N hydrochloric acid. The precipitated pyrazolone is collected, washed thoroughly with cold water, dissolved in excess 10% sodium hydroxide solution, and the resulting solution is refluxed for a short period. Acidification with hydrochloric acid gives 32 parts of 1-methyl-3-(p-carboxyphenyl)-5-pyrazolone.

1-methyl-3-(p-carboxyphenyl)-5-pyrazolyl ethyl carbonate

To a solution of 16 parts of potassium hydroxide in 100 parts of water is added 32 parts of 1-methyl-3-(p-carboxyphenyl)-5-pyrazolone. The solution is cooled to 0° C. by the addition of ice and, while being stirred vigorously, 19.5 parts of ethyl chlorocarbonate is added in one portion. After stirring for 15 minutes, the solution is acidified by the addition of 30% acetic acid. The 1-methyl-3-(p-carboxyphenyl)-5-pyrazolyl ethyl carbonate is collected and after two crystallizations from alcohol, melts as 196°–198° C.

1-methyl-3-(p-chloroformylphenyl)-5-pyrazolyl ethyl carbonate

To a mechanically stirred suspension of 12.7 parts of 1-methyl-3-(p-carboxyphenyl)-5-pyrazolyl ethyl carbonate in 80 parts of anhydrous benzene heated to reflux is added 9.5 parts of thionyl chloride. The heat treatment is continued for one hour, during which time the evolution of hydrogen chloride and sulfur dioxide ceases. Concentration of the benzene solution under reduced pressure gives a colorless solid in quantitative yield.

m-[p-(5-ethylcarbonato-1-methyl-3-pyrazolyl)-benzamido]-benzaldehyde ethylene glycol acetal A solution of 13.5 parts of 1-methyl-3-(p-chloroformylphenyl)-5-pyrazolyl ethyl carbonate in 25 parts of anhydrous dioxane is added dropwise to a mechanically stirred suspension of 7.4 parts of m-aminobenzaldehyde ethylene glycol acetal, 25 parts of water, 7 parts of anhydrous potassium carbonate and 25 parts of dioxane maintained at 0°–5° C. by means of external cooling. The stirring at 0°–5° C. is continued for 1.5 hours, during which time the acetal separates first as an oil which solidifies. Crystallization from acetone-water gives colorless needles.

Analysis calculated for $C_{23}H_{23}O_6N_3$: C=63.13, H=5.30, N=9.61; Found: C=62.63, 62.93; H=5.25, 5.20; and N=9.62.

m-[p-(5-ethylcarbonato-1-methyl-3-pyrazolyl)-benzamido]-benzaldehyde

To a solution of ten parts of m-[p-(5-ethylcarbonato-1-methyl-3-pyrazolyl)benzamido]-benzaldehyde ethylene glycol acetal in 80 parts of acetone heated to 40° C. is added 50 parts of 3 N hydrochloric acid. After cooling to 0° C. by the addition of ice, the crystalline product is collected, washed free of acid with cold water, and crystallized from an acetone-water mixture. The colorless, glistening needles melt at 180°–182° C.

Analysis calculated for $C_{21}H_{19}O_5N_3$: C=64.11, H=4.76, N=10.68; Found: C=64.57, 63.95; H=4.76, 4.82; and N=10.95.

Procedure C

1-(p-carboxyphenyl)-3-phenyl-5-pyrazolone

To a suspension of 188 parts of p-carboxyphenyl-hydrazine hydrochloride in 1000 parts of water is added sufficient sodium hydroxide (approximately 30 parts) to bring the pH of the solution to a value of 7.0–7.5. The solution is heated with decolorizing charcoal and to the light-yellow filtrate is added 1200 parts of ethanol and 1150 parts of water. The solution is heated to 65° C. and a mixture of 192 parts of ethyl benzoylacetate, 90 parts of acetic acid and 80 parts of ethanol is added with stirring during the course of about five minutes. The thick reaction mixture is digested at 65°–70° C. for one hour, filtered and washed first with 1000 parts of 30% alcohol and finally with hot water until the filtrate is colorless. The resulting colorless filter cake is suspended in 1800 parts of water and sufficient solid sodium hydroxide (approximately 80 parts) is added to make the solution alkaline to phenolphthalein. The resulting solution is boiled gently for 30 minutes, the pH of the solution adjusted to about 7 and the solution is treated with decolorizing charcoal. A mixture of 1000 parts of ethanol and 875 parts of water is added, the solution is heated to 90°–95° C., and acidified by the addition of 240 parts of 50% acetic acid. The colorless 1-(p-carboxyphenyl)-3-phenyl-5-pyrazolone is collected, washed first with 30% ethanol, then with hot water until the filtrate is colorless and finally with 800 parts of methanol. The yield of colorless 1-(p-carboxyphenyl)-3-phenyl-5-pyrazolone is 180–210 parts.

1-(p-carboxyphenyl)-3-phenyl-5-pyrazolyl ethyl carbonate

To a solution of 42 parts of potassium hydroxide in 250 cc. of water is added 94 parts of 1-(p-carboxyphenyl)-3-phenyl-5-pyrazolone. The solution is cooled to 0° C. by the addition of ice, 49 parts of ethyl chlorocarbonate is added and the mixture is stirred for 15 minutes. To this solution is added 80 parts of methanol, the mixture is heated to 20° C., and acidified by the addition of 60 parts of 50% acetic acid. The 1-(p-carboxyphenyl)-3-phenyl-5-pyrazolyl ethyl carbonate is collected, washed with water, and after crystallization from ethanol melts at 175°–177° C.

1-(p-chloroformylphenyl)-3-phenyl-5-pyrazolyl ethyl carbonate

To a mechanically stirred suspension of 70.4 parts of 1-(p-carboxyphenyl)-3-phenyl-5-pyrazolyl ethyl carbonate in 160 parts of anhydrous benzene heated to reflux is added slowly 30 parts of thionyl chloride. After refluxing for 0.5 hour, a clear solution is obtained and the evolution of sulfur dioxide and hydrogen chloride has ceased. Removal of the benzene under reduced pressure gives a solid melting above 90° C.

m-[p-(5-ethylcarbonato-3-phenyl-1-pyrazolyl)-benzamido]benzaldehyde ethylene glycol acetal A solution of 74 parts of 1-(p-chloro-formylphenyl)-3-phenyl-5-pyrazolyl ethyl carbonate in 100 parts of anhydrous dioxane is added dropwise to a mechanically stirred suspension of 33 parts of m-amino-benzaldehyde ethylene glycol acetal, 31 parts of anhydrous potassium carbonate, 65 parts of water and 70 parts of dioxane cooled to 0° C. by means of external cooling. The resulting suspension is stirred at 0° C. for two hours, about 200 parts of water being added during this period. Further dilution of the reaction mixture with water precipitates the m-[p-(5-ethylcarbonato-3-phenyl-pyrazolyl)benzamido]-benzaldehyde ethylene glycol acetal as an oil which does not crystallize.

*m -[p-(5-ethylcarbonato-3-phenyl-1-pyrazolyl)-benzamido]-benzaldehyde*

To a solution of 100 parts of crude m-[p-(5-ethylcarbonato-3-phenyl-1-pyrazolyl)benzamido]benzaldehyde ethylene glycol acetal in 200 parts of acetone heated to 40° C. is added 200 parts of 3 N hydrochloric acid. The mixture is cooled to 0° C. by the addition of ice and the crude m-[p-(5-ethylcarbonato-3-phenyl-1-pyrazolyl)-benzamido]benzaldehyde is collected, washed free of acid with cold water and, after drying, is crystallized from benzene. The fine, colorless needles melt at 144°–146° C.

Analysis calculated from $C_{26}H_{21}O_5N_3$: C=68.54, H=4.65, N=9.23; Found: C=68.66, 68.67; H= 4.51, 4.54; and N=9.16, 9.52.

The polyvinyl alcohol used in the foregoing examples was obtained by completely hydrolyzing polyvinyl acetate and had a solution viscosity (4% in water) of 18–24 centipoises at 20° C. Other completely hydrolyzed polyvinyl acetates ranging in viscosity from 5 to 50 centipoises in 4% aqueous solution have also been found useful. However, the invention is not limited to the use of this particular type of vinyl alcohol polymer. On the contrary, other polyvinyl alcohols prepared by polymerizing a vinyl ester, e. g., vinyl acetate, vinyl chloracetate, vinyl propionate, vinyl butyrate, etc., followed by partial or complete hydrolysis and, if desired, by further reaction to introduce minor portions of other modifying groups, e. g., acetal, ester or ether groups, etc., can be used. Hydrolyzed interpolymers of vinyl esters with minor (3.0% or less by weight) portions of other vinyl compounds, e. g., vinyl chloride, alkyl acrylates, methacrylates, etc., are often useful in preparing the hydrophilic dye intermediates, especially where a lower degree of water solubility is desired. Such polymers have a straight chain, the major portion of which consists solely of —$CH_2$— and —CHOR— groups in equal number where R is mainly H.

Still other useful products are the water-soluble hydrolyzed olefin/vinyl ester interpolymers and especially the hydrolyzed ethylene/vinyl acetate interpolymers described in United States Patents 2,386,347 and 2,397,866.

All of the vinyl alcohol polymers useful in preparing the color-forming polymeric acetals of this invention have the group —$CH_2$—CHOH— representing at least 50% of the polymer chain, i. e., for every 100 chain atoms there are at least 25 hydroxyl groups. Further it is preferred that the final color-forming polyvinyl acetals themselves contain at least 12.5 hydroxyl groups for every 100 chain atoms and that the polymer consist of at least 25% (—$CH_2$—CHOH—) groups so that they will have the desired permeability-solubility characteristics as herein defined. It is also preferred that between 1 and 15 color-forming acetal groups shall be present for each 100 chain atoms. The preferred hydrophilic color-forming acetals are highly polymeric (that is, they have a polymer chain in excess of 200 carbon atoms) and form strong unsupported films when dry. In addition, it is preferred that these hydrophilic color-forming polyvinyl acetals are not dissolved by cold water (20° C.) but are soluble to the extent of at least five parts in 100 parts of boiling water or a boiling mixture of water containing less than 50% of a water-miscible organic solvent and preferably less than 25% of ethanol.

Similarly the invention is not limited to acetals of vinyl alcohol polymers from the aldehydes and lower acetals described in the working examples but is applicable to any of the acetals and aldehydes disclosed generically or specifically above. A large number of useful compounds of this type are listed in application Serial No. 667,125, filed May 3, 1946.

Additional acid chlorides which can be used to form the acetals and aldehydes as disclosed in application Serial No. 667,125 include 1-(4'-chloroformylphenyl)-3-(2'-thienyl)-5-pyrazolyl ethyl carbonate, 1-(3'-chloroformylphenyl)-3-isopropyl-5-pyrazolyl benzoate, 1-(2'-bromo-4'-chloroformylphenyl)-3-(ter.-butyl)-5-pyrazolyl methyl carbonate, 1-(2'-chloro-5'-chloroformylphenyl)-3-ethyl-5-pyrazolyl acetate, 1-(4'-chloroformylphenyl)-3-(3'-pyridyl)-5-pyrazolyl p-chlorobenzoate, 1-(2'-methoxy-4'-chloroformylphenyl)-3-(ter.-amyl)-5-pyrazolyl p-nitrobenzoate, 1-(2'-methoxy-6'-chloro-4'-chloroformylphenyl)-3-methyl-5-pyrazolyl ethyl carbonate and 1-(2'-phenoxy-4'-chloroformylphenyl)-3-ethyl-5-pyrazolyl chloroacetate.

Thus the acyl, hydrocarbon, etc., radicals may be varied quite widely. In the above formula the acyl radicals may correspond to any monocarboxylic or sulfonic acid free from acid halide-reactive groups, including fatty acids, aromatic acids, heterocyclic acids, and their chlorides and bromides. Suitable radicals include acetyl, propionyl, butyryl, chloracetyl, carboalkoxy, e. g., carbethoxy, carbomethoxy; fluoracetyl, hexanoyl, stearoyl, benzoyl, p-nitrobenzoyl, chlorobenzoyl, p-ethylbenzoyl, 1-naphthoyl, 2-naphthoyl, picotinoyl, nicotinoyl, isonicotinoyl, furoyl, thienoyl, cyclohexanoyl, benzenesulfonyl, p-toluenesulfonyl, butanesulfonyl, chlorobutanesulfonyl, and cyclohexanesulfonyl.

R' in Formula 1 is preferably a divalent aliphatic or aromatic hydrocarbon nucleus or a heterocyclic nucleus but may consist of two of such nuclei joined by a bivalent bridging radical, e. g., —O—, —S—, —NH—, —CO—, —$SO_2$—, —CONH—. The hydrocarbon nuclei may contain various substituents which are common in color formers and do not enter into dye coupling reactions, e. g., alkoxy, chlorine, bromine, nitro, sulfonamide, carbonamide, etc.

In order to be useful as dye intermediates, i. e., as color formers for color photography, or as azo coupling components for textile dyeing, the 5-acyloxy-pyrazole nucleus must have a hydrogen atom attached to the 4-carbon atom.

The acetalization of polyvinyl alcohol with the color-forming aldehydes and acetals referred to above may be carried out over a wide range of temperatures but the preferred range is 40°–80° C. At lower temperatures the rate of reaction is normally too slow for practical application and at higher temperatures undesirable side reactions sometimes occur, such as cross-linking, insolubilization of polyvinyl alcohol, splitting of the acyl group in the 5-acyloxypyrazole, etc.

As indicated in the examples, the acetalization reaction may be carried out by heat treatment of a suspension or solution of the polymeric alcohol in a solvent for the color former. Additional solvents include formamide, dimethyl formamide, alcohols, e. g., methanol, ethanol, propanol, and isopropanol, acetic acid, dioxane, acetone and mixtures of these with water, containing a relatively small concentration of a mineral acid, generally 0.1–5.0%, preferably 1–3% of the weight of the reaction medium.

The degree of acetalization of the polyvinyl alcohol is capable of wide variations depending upon the ratio of the reactants and the reaction conditions. Although products of low substitution are useful, it is preferred to prepare polyvinyl acetals having a relatively high percentage of 5-acyloxypyrazole nuclei since these products produce the maximum color density obtainable from the amount of silver salts reduced by the color developer and can be used in thin layers in films for color photography. The percentage of color former in the polyvinyl acetal can be expressed on a weight basis by dividing the amount of color former actually combined with the polyvinyl alcohol by the weight of polyvinyl acetal. Expressed on this basis, compositions containing 5–50% of color former, preferably 10–30%, are most satisfactory for use as color-forming binding agents for silver halide salts as they are not soluble or softened appreciably in water at ordinary temperatures, that is, below 30° C., are readily permeable to water and photographic processing solutions, are transparent and colorless, are soluble in water or alcohol-water mixtures, and are able to disperse and prevent coagulation or sedimentation of silver salts.

The solubility of the polyvinyl acetals of this application can be varied for a given degree of substitution by changing the type of polyvinyl alcohol used for the preparation of the polyvinyl acetal. The solubility and permeability of the polyvinyl acetals of this application may also be controlled by reaction of a part of the hydroxyl groups with compounds free from dye intermediate groups. Thus, the water-solubility may be decreased by esterification of polyvinyl alcohol with an organic acid, such as acetic acid, by acetalization of polyvinyl alcohol with an aldehyde, such as benzaldehyde, or by etherification of polyvinyl alcohol with alkyl halides, such as benzyl chloride. The water-solubility may be increased by esterification with dibasic acids in which only one of the carboxylic acid groups reacts with polyvinyl alcohol, by acetalization with aldehydes containing a carboxylic or sulfonic acid group, such as glyoxylic acid or o-sulfobenzaldehyde, or by etherification of polyvinyl alcohol with an alkyl halide containing a carboxylic or sulfonic acid group, such as chloroacetic acid, beta-chloroethanesulfonic acid, etc.

The products of this invention are useful in the preparation of multilayer color film and paper since they can serve as the color former and at the same time serve as the silver halide binding agent. They are resistant to bacterial putrefaction and mold and can be stored for longer periods of time under adverse conditions than can the conventional gelatin emulsions. The developed colors possess exceptional fastness to washing and are entirely non-migratory, important requirements for the production of sharp and clear images. Films or papers utilizing these color-forming polyvinyl acetals can, of course, be developed with any known photographic developer and are of use for black-and-white negatives and positives, as well as for color.

The color-forming polyvinyl acetals can also be used as additions to photographic emulsions prepared with other binding agents, for example, gelatin, the hydrolyzed ethylene/vinyl acetate interpolymers described in United States Patent 2,397,866, polyvinyl alcohol and hydrolyzed cellulose esters, for example, cellulose acetate hydrolyzed to a relatively low ester content, e. g., the products described in United States Patent 2,110,491. In addition, they may serve as non-photographic layers lying adjacent to or capable of being placed in intimate contact with photographic layers. In such cases the oxidized color developer diffuses into the polymeric color former layer and forms dyes therein. The polymeric acetals of this invention couple with diazonium salts to form azo dyes. This can be utilized in known processes of color photography in which azo dye components are employed, as disclosed, for example, in United States Patent 2,179,228, 2,071,688, 2,297,732, and 2,339,213. In addition, they can be used for textile dyeings and for decorative purposes, for example, by incorporation in a viscose dope and conversion to a fiber or film that can be locally or completely converted to color by treatment with diazonium salts, oxidized p-phenylenediamine derivatives, or the like.

As many widely different embodiments of this invention can be made without departing from the spirit and scope thereof, it is to be understood that the invention is not to be limited except as defined by the claims.

What is claimed is:

1. The 5-acyloxypyrazole amidoacetals having a recurring structural unit taken from the group consisting of those of the formulae:

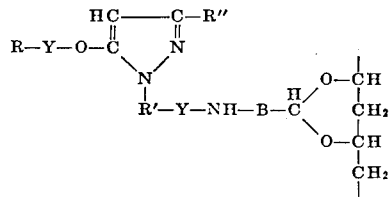

and

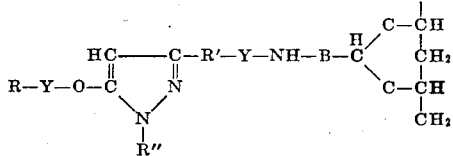

wherein R—Y— is an acyl radical taken from the class consisting of carbonyl acyl and sulfonyl acyl, Y is a radical taken from the group consisting of carbonyl and sulfonyl radicals, R' is divalent organic radical linked by hydrocarbon carbon atoms to the cyclic atom and Y as shown, R" is a monovalent hydrocarbon nucleus, and B is a divalent organic radical linked by hydrocarbon carbon atoms to NH and the carbon atom having an acetal linkage to the vinyl alcohol unit, and a plurality of recurring intralinear

groups the free bonds of which latter groups are in the same linear chain of atoms as the chain of four carbon atoms shown in the structural units of the preceding formula with an unsatisfied valence on the end carbon atoms of such latter chain.

2. The 5-acyloxypyrazole amidoacetals having recurring structural units of the formula:

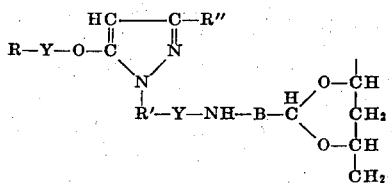

wherein R—Y— is an acyl radical taken from the class consisting of carbonyl acyl and sulfonyl acyl radicals; Y is a member taken from the group consisting of carbonyl and sulfonyl radicals, R' is a divalent organic radical linked by hydrocarbon carbon atoms to the cyclic nitrogen atom and Y; R" is a monovalent hydrocarbon nucleus; and B is a divalent organic radical linked by hydrocarbon carbon atoms to NH and the carbon atom having an acetal linkage to the vinyl alcohol units and a plurality of recurring intralinear

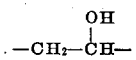

groups the free bonds of which latter groups are in the same linear chain of atoms as the chain of four carbon atoms shown in the structural units of the preceding formula with an unsatisfied valence on the end carbon atoms of such latter chain.

3. The 5-acyloxypyrazole amidoacetals having recurring structural units of the formula:

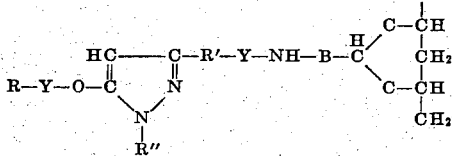

wherein R—Y— is an acyl radical taken from the class consisting of carbonyl acyl and sulfonyl acyl radicals; Y is a member taken from the group consisting of carbonyl and sulfonyl radicals, R' is a divalent organic radical linked by hydrocarbon carbon atoms to the cyclic carbon atom and Y; R" is a monovalent hydrocarbon nucleus; and B is a divalent organic radical linked by hydrocarbon carbon atoms to NH and the carbon atom having an acetal linkage to the vinyl alcohol units and a plurality of recurring intralinear

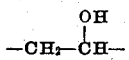

groups the free bonds of which latter groups are in the same linear chain of atoms as the chain of four carbon atoms shown in the structural units of the preceding formula with an unsatisfied valence on the end carbon atoms of such latter chain.

4. The 5-acyloxypyrazole amidoacetals having recurring structural units of the formula

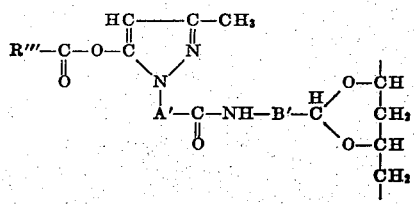

wherein R''' is an alkoxy radical of 1 to 2 carbon atoms; A' is a divalent hydrocarbon nucleus which is attached to the 1-nitrogen atom through an aromatic hydrocarbon radical and B' is a phenylene radical and a plurality of recurring intralinear

groups the free bonds of which latter groups are in the same linear chain of atoms as the chain of four carbon atoms shown in the structural units of the preceding formula with an unsatisfied valence on the end carbon atoms of such latter chain.

5. The 5-acyloxypyrazole amidoacetals having recurring structural units of the formula

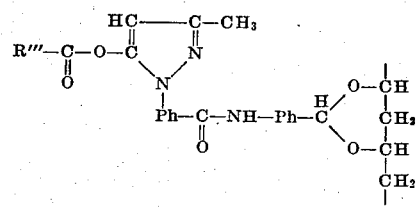

where R''' is an alkoxy radical of 1 to 2 carbon atoms and Ph is a phenylene radical and a plurality of recurring intralinear

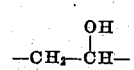

groups the free bonds of which latter groups are in the same linear chain of atoms as the chain of four carbon atoms shown in the structural units of the preceding formula with an unsatisfied valence on the end carbon atoms of such latter chain.

6. The m-[p-(5-ethylcarbonato-3-methyl-1-pyrazolyl)-benzamido]benzaldehyde acetals of polyvinyl alcohol.

7. The m-[p-(5-benzoxy-3-methyl-1-pyrazolyl)-benzamido]benzaldehyde acetals of polyvinyl alcohol.

ELMORE LOUIS MARTIN.

REFERENCES CITED

The following references are of record in the file of this patent:

UNITED STATES PATENTS

| Number | Name | Date |
|---|---|---|
| 2,320,422 | Frohlich | June 1, 1943 |
| 2,397,864 | Jennings | Apr. 2, 1946 |

FOREIGN PATENTS

| Number | Country | Date |
|---|---|---|
| 27,485 | Great Britain | 1907 |

OTHER REFERENCES

Weissberger et al. (Jour. Amer. Chem. Soc.), vol. 65, 1943, pp. 1495–1502.

Certificate of Correction

Patent No. 2,476,988

July 26, 1949

ELMORE LOUIS MARTIN

It is hereby certified that errors appear in the printed specification of the above numbered patent requiring correction as follows:

Column 5, line 33, for the numeral "4" read *4%*; column 8, line 4, for "785 parts" read *185 parts*; line 10, for the words "of piece" read *of a piece*; line 15, for "five parts" read *four parts*; lines 56 and 57, for "chloroformylphenyl" read *chloroformylphenyl)*; column 12, lines 45 and 46, for "picotinoyl" read *picolinoyl*; column 14, line 22, for "Patent" read *Patents*;

and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*